B. B. BULLWINKLE.

SNAP-HOOK.

No. 171,984. Patented Jan. 11, 1876.

WITNESSES:

INVENTOR:
Benjamin B. Bullwinkle
by Munday & Evarts
his attys.

UNITED STATES PATENT OFFICE.

BENJAMIN B. BULLWINKLE, OF CHICAGO, ILLINOIS.

IMPROVEMENT IN SNAP-HOOKS.

Specification forming part of Letters Patent No. 171,984, dated January 11, 1876; application filed November 12, 1875.

*To all whom it may concern:*

Be it known that I, BENJAMIN B. BULLWINKLE, of Chicago, in the county of Cook and State of Illinois, have invented certain Improvements in Snap-Hooks, of which the following is a specification:

This improved hook, although it may with advantage be used at all places where a secure and easily-operated snap-hook is required, is especially designed for use upon fire apparatus, where great security and dispatch are required. The harness by which the horses are attached to fire apparatus requires to be fitted with snap-hooks instead of the more secure buckles, &c., employed with ordinary harness, as the buckles require too much manipulation and time. It is of the utmost importance that these snap-hooks should be absolutely secure against accidental disengagement, otherwise deplorable accidents and delays are likely; and it is of like importance that the hook should be so constructed that the couplings may be instantly made, even in the dark, and made with a single motion, and with unerring certainty. This requires that there shall be a wide opening to the hook, and a very limber spring, and also that there shall be some means for guiding the hook properly to place in coupling.

It was with these requirements in view that this invention was made. The means employed to accomplish these ends, and which constitutes my invention, will be easily understood from the subjoined description and the accompanying drawing, which forms a part of this specification, and in which—

Figure 1:
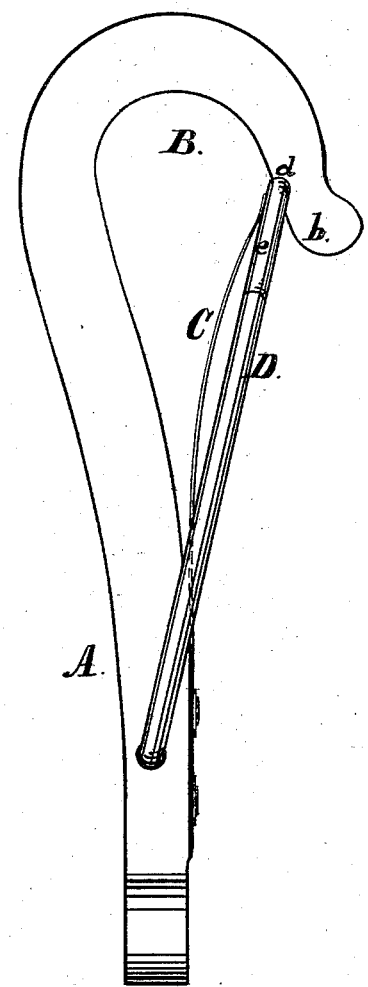
Figure 2:
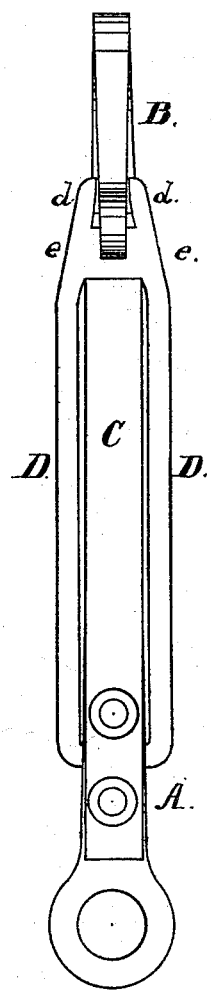

Figure 1 represents a side view of my improved hook, and Fig. 2 is a front view of the same.

Like letters of reference made use of in the several figures indicate like parts.

In said drawing, A represents the shank, and B the hook. C is a spring attached to the face of the shank, and extending up diagonally toward the point of the hook. This spring should be as limber as possible, being made only just stiff enough to do the work set for it to do—that is to say, just stiff enough to securely hold the guard in place, and not stiff enough to impede the operation of coupling the hook.

D is a guard-piece, hinged to the shank well down toward the eye, and extending diagonally up to near the point of the hook, and embracing the hook in the manner shown, so that it cannot be displaced laterally. The nibs *d* prevent such lateral displacement. The guard engages the hook not exactly at the point, but a little above, leaving a space, *b*, which forms a projection or nipple, whereby the hook may be arrested in coupling, and engagement insured.

It will be noticed that the distance from the eye to the point is very great compared to the size of the instrument. This gives ample opening to the hook, and greatly facilitates the operation of rapid coupling.

If the hook, in the operation of coupling, is brought against the ring, staple, or loop to which it is to be coupled at any point between the eye and the point, the coupling is sure to be effected, as the nipple at *b* will arrest any tendency of the hook to slip past the possibility of engagement.

The sides of the guard at its outer end are beveled away, as shown at *e*, Fig. 2, so that when coupled the ring or other object within the hook shall not find any purchase or shoulder against which it may rest in twisting, and so cannot twist itself free.

Having thus fully described my invention, I claim as new and desire to secure by Letters Patent—

A snap-hook composed of the shank A and hook B, in combination with the beveled slotted guard D and spring-tongue C, constructed and operating in the manner and for the purpose specified.

B. B. BULLWINKLE.

Witnesses:
JOHN W. MUNDAY,
FORD R. SMITH.